March 4, 1947. S. M. JESSOP ET AL 2,416,695
METHOD AND APPARATUS FOR IMPREGNATING FILTER MATERIAL
Filed Jan. 6, 1936 7 Sheets-Sheet 3

FIG. 3

INVENTORS
STUART M. JESSOP
HARRY E. DYER
BY
ATTORNEY.

March 4, 1947. S. M. JESSOP ET AL 2,416,695
METHOD AND APPARATUS FOR IMPREGNATING FILTER MATERIAL
Filed Jan. 6, 1936 7 Sheets-Sheet 4

FIG. 4

INVENTORS
STUART M. JESSOP
HARRY E. DYER
BY
ATTORNEY.

FIG. 6

March 4, 1947.  S. M. JESSOP ET AL  2,416,695
METHOD AND APPARATUS FOR IMPREGNATING FILTER MATERIAL
Filed Jan. 6, 1936  7 Sheets-Sheet 7

INVENTORS
STUART M. JESSOP
HARRY E. DYER
BY
ATTORNEY.

Patented Mar. 4, 1947

2,416,695

UNITED STATES PATENT OFFICE 2,416,695

METHOD AND APPARATUS FOR IMPREGNATING FILTER MATERIAL

Stuart M. Jessop, Baltimore, and Harry E. Dyer, Havre de Grace, Md.

Application January 6, 1936, Serial No. 57,732

17 Claims. (Cl. 117—16)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to a filter material impregnation and more particularly to an improved method and machine for continuously depositing fine carbon particles on the fibers of filter paper or similar material. The paper thus impregnated is particularly useful in gas mask filters for purifying air drawn therethrough.

It has long been known that the efficiency of filter material in removing smoke and gas from air is increased when the material is impregnated with carbon. However, the carbon must not collect on the outer surface of the material since this causes too great resistance to air flow, thus making the impregnated material unsuitable for use in gas mask canisters. Difficulty has heretofore been encountered in obtaining impregnation within the interstices of the filtering material without too greatly increasing the resistance to air flow.

Filter paper impregnated with fine carbon particles makes a good filter for use in canisters for gas masks. However, prior known methods of impregnating filter paper with carbon have not been entirely satisfactory, sometimes resulting in an excess accumulation of carbon on the surface of the paper, and sometimes in an agglomeration of carbon particles between the fibers of the paper.

One object of this invention is to provide an impregnating machine in which filter material such as filter paper may be impregnated with fine carbon particles, the carbon particles adhering to the fibers of the material and not collecting between the fibers and clogging the openings.

Another object of this invention is to provide an improved machine for continuously impregnating a sheet or roll of filter material with carbon as the material is passed through the machine.

Another object of this invention is to provide an improved machine for continuously impregnating a sheet or roll of filter material with carbon smoke particles and provided with a gauge to measure the amount of impregnation continuously as the material is impregnated and having readily accessible controls to vary the impregnation in accordance with the gauge reading.

Another object of this invention is to provide a machine in which a sheet or roll of filter material may be continuously impregnated with fine carbon particles uniformly throughout the cross section of the material.

Another object of this invention is to provide an improved impregnating machine of the character above indicated which is entirely practical for quantity production and which may be operated by relatively unskilled workmen.

These and various other objects of this invention will be apparent from the following description and appended claims, with the understanding that the several necessary elements comprising the invention may be varied in construction, proportions and arrangement without departing from the spirit of the invention nor exceeding the scope of the claims.

In order to make the invention more clearly understood, we have shown in the accompanying drawings means for carrying the same into practical effect, without limiting the improvements in their useful applications to the particular constructions, which for the purpose of explanation, have been made the subject of illustration.

Figure 1:
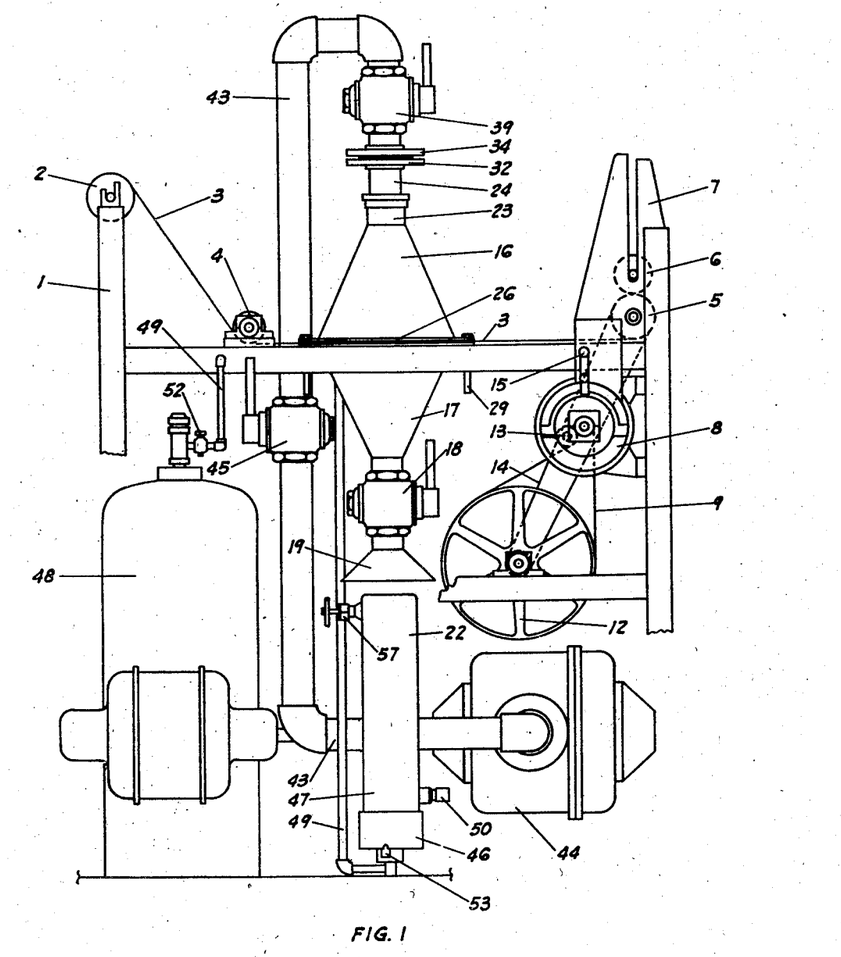
Fig. 1 is a front elevation of the machine.
Figure 2:
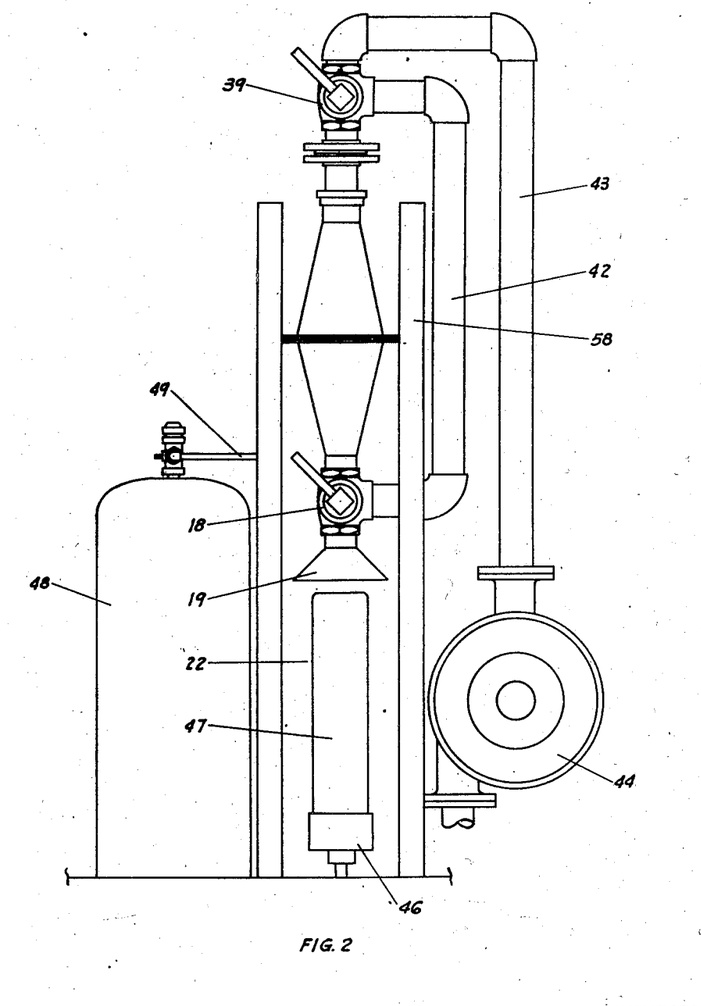
Fig. 2 is an end elevation thereof.

Referring to Fig. 1 of the drawings, the impregnating machine is mounted on a suitable frame including a slotted upright 1 for supporting a roll 2 of the material 3 to be impregnated. For use in gas mask canisters, a special porous uncalendered filter paper has been found most satisfactory and this paper will be herein described, it being understood that the invention is not limited to any specific material. From the roll 2 the paper 3 passes beneath roll 4 and thence horizontally through the impregnating chamber, hereinafter more fully described. From the impregnating chamber the paper 3 passes beneath a roll 5 and is then wound on roll 6, both mounted on an upright frame member 7. A variable speed motor 8 drives a belt 9 which drives pulley 12, the belt being kept taut by a spring pressed idler pulley 13. Pulley 12 drives belt 14 at reduced speed which in turn drives a pulley on the shaft of roll 5. Rolls 5 and 6 are in surface engagement, the paper 3 passing beneath roll 5 and then between rolls 5 and 6 to wind on roll 6. Roll 6 is thus driven by the forward movement of the paper, giving a constant speed of movement of the paper irrespective of the increase in size of roll 6 as the paper is wound thereon.

A speed control handle 15 is provided for motor 8 to vary the speed of the passage of paper through the machine. In the machine as illustrated, this linear speed may be varied from 60 to 120 feet per minute, 100 feet per minute being the usual speed.

The impregnating chamber comprises two four-sided pyramidal hoods 16 and 17. The lower hood 17 is stationarily supported on cross frame members and has its lower end connected to a pipe having a threeway cock 18 connected therein. The lower opening of cock 18 is connected to an outwardly flaring hood 19 which is positioned directly above but spaced from an acetylene smoke generator 22.

Figure 3:
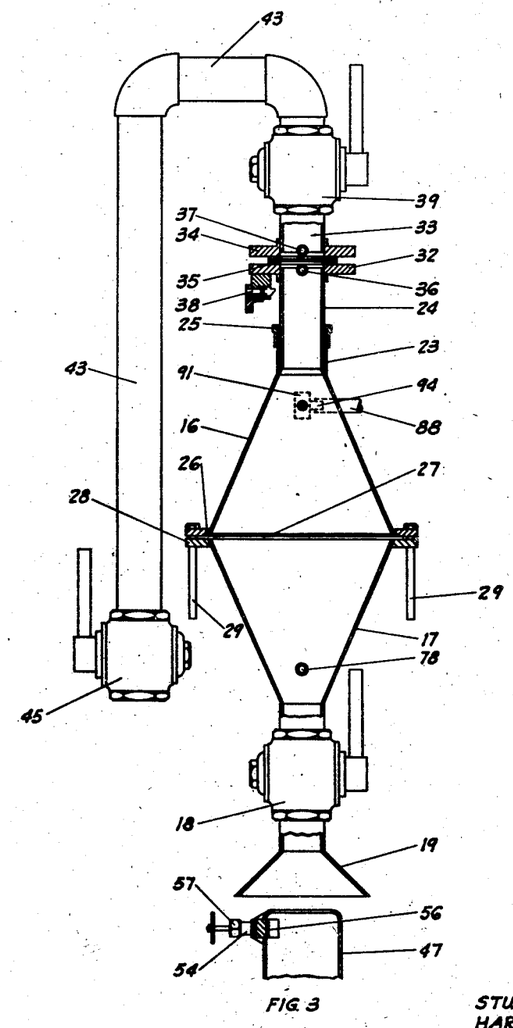
Fig. 3 is a part elevation part sectional view of the impregnating chamber and piping.

Upper hood 16 has secured to its upper end a short pipe 23 which telescopes over a stationary pipe 24; see Fig. 3. Pipe 23 has a packing nut 25 threaded thereon with packing engaging pipe 24 to form an air tight joint. The upper hood 16 is adapted to be raised for inserting the paper to be impregnated, the paper passing continuously between the two abutting bases of hoods 16 and 17. Upper hood 16 has a rectangular frame 26 welded or otherwise secured thereto, the frame having a steel wire mesh 27 which extends completely across the impregnating chamber. Lower hood 17 has a corresponding frame 28 secured thereto having openings at two corners to slidably receive guide pins 29 carried by upper hood 16. A suitable spacer is interposed between the proximate faces of frames 26 and 28 to prevent gripping of the paper which passes between these frames through the impregnating chamber.

Upper end of stationary pipe 24 has secured thereto a flange 32 and a similar pipe 33 has a flange 34 thereon. Flanges 32 and 34 are bolted together to position an orifice plate 35 within the conduit, a suitable gasket interposed between the flanges making a tight joint. Guide pins are secured to one flange and project through openings in the orifice plate and gasket to secure the same in position. Flanges 32 and 34 have openings 36 and 37 opening into the conduit on opposite sides of orifice plate 35. The orifice meter thus provided is connected to a suitable measuring device hereinafter described to measure flow of air and smoke in accordance with well known principles.

In order to support the upper hood 16 in its raised position when paper is being inserted in the machine, a spring pressed latch 38 is supported by the lower flange 32, the inner nose of the latch engaging the packing nut 25 when the hood 16 is raised. Latch 38 is readily released by pulling a finger piece thereon.

Figure 4:
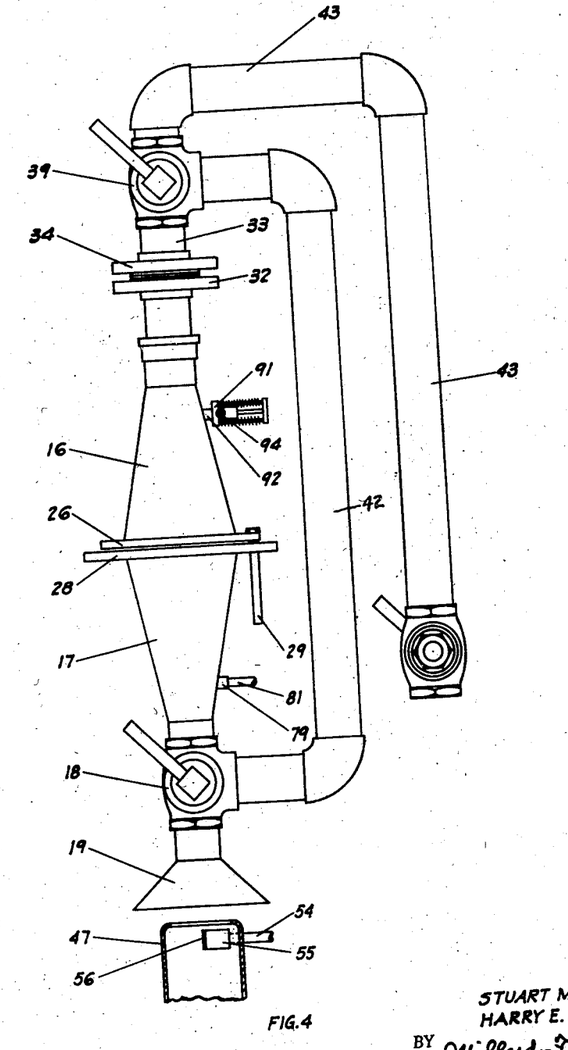
Fig. 4 is an end elevation thereof.

Above the orifice plate, pipe 33 is supported on the frame and has connected thereto a three-way cock 39. The two side connections of cocks 18 and 39 are connected by a pipe 42 (Fig. 4) which is a by-pass around the impregnating chamber formed by hoods 16 and 17. By operating the handles of cocks 18 and 39 the smoke may be passed through the impregnating chamber with the by-pass 42 cut off, or the by-pass may be opened and the passage through the impregnating chamber cut off. Thus a fresh roll of filter paper may be inserted without shutting down the smoke generator. If a single valve were used to merely cut off passage of smoke through the machine, the fine carbon particles would collect on the pipe and valve and result in the deposit of large particles on the surface of the paper when operation of the machine was resumed.

From cock 39 the main discharge pipe 43 extends downwardly and is connected to a vacuum pump 44, a suction control valve 45 being interposed in pipe 43. The smoke produced in generator 22 is drawn by the partial vacuum into the hood 19, through the impregnating chamber and is deposited in the paper as the paper passes through, the excess smoke and air passing to the vacuum pump and being exhausted.

The smoke generator 22 comprises a base member 46 and a detachable burner flue 47 wherein acetylene is burned with an insufficient supply of air to form fine carbon smoke particles. Acetylene is supplied from a tank 48 to a burner tip in the base 46 by a pipe 49 having a cut-off valve 52 therein. A removable plug 50 in the side of flue 47 may be removed in order to light the tip, and is then replaced. The air supply to the burner tip is controlled by adjustment of pointer 53 which operates an air valve.

In order to rapidly cool the smoke and to prevent the agglomeration of large particles of carbon on the walls of the burner flue 47, a current of water is continuously passed circumferentially around the inner surface of the flue, this water entering near the top and leaving at the bottom. For this purpose, a water supply pipe 54 has a plate 55 secured in an opening in the flue 47 and provided with a slot 56 opening circumferentially into the flue. A valve 57 controls the flow of water through the flue. This stream of water whirls around the inside of the flue and escapes through an outlet in the base 46, thus cooling the smoke and effectively preventing any collection of carbon in the flue wall.

The efficient operation of the present machine depends upon a careful control of the kind and quantity of smoke generated, the speed of the paper in passing through the impregnating chamber, the resistance of the impregnated paper to air flow, and the total quantity of air and smoke passing through the impregnating chamber, and these variables must be readily ascertainable at all times in order to coordinate them. Readily visible measuring devices are therefore positioned on the machine in conjunction with control means to adjust these variables.

Figure 6:
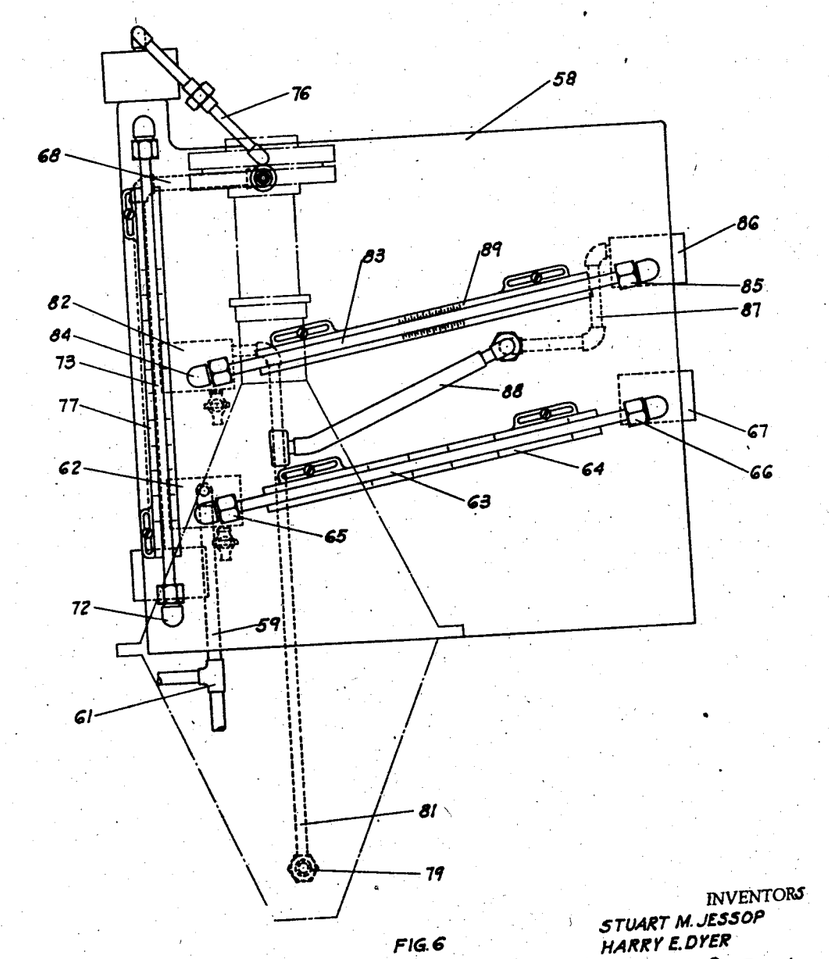
Fig. 6 is a front elevation of the instrument board with the impregnating chamber shown in broken lines.
Figure 9:
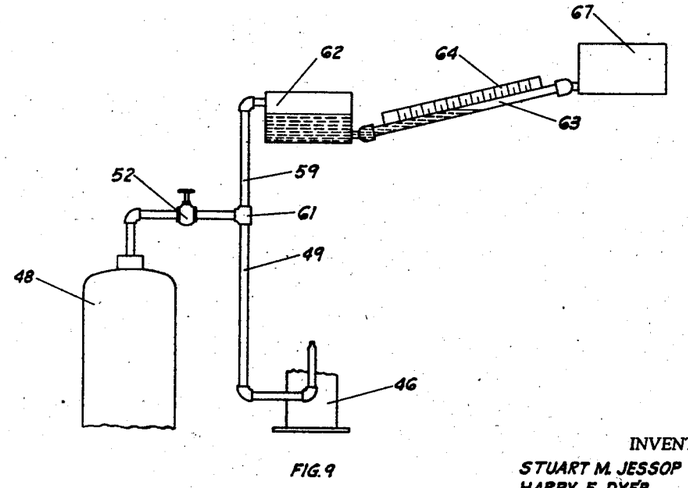
Fig. 9 is a similar view of the acetylene flow measuring apparatus.

An instrument panel 58 is supported in back of the impregnating chamber upon which is mounted the indicating devices. In order that the operator may know at all times the quantity of smoke being generated, an acetylene flow measuring device is used, comprising a pipe 59 connected to a T fitting 61 in the acetylene pipe 49 leading from the acetylene tank 48 to the burner 22. Pipe 59 passes upwardly to the rear of instrument panel 58 and opens into a tank 62 near the upper portion thereof, as seen in Figs. 6 and 9. A gauge glass 63 is mounted on the front of panel 58 with a scale 64 in back of the same, the glass 63 being angularly positioned and having its lower end connected to a fitting 65 leading to the lower portion of tank 62. At its upper end, gauge glass 83 has a fitting 66 passing through panel 58 and connected to an overflow tank 67, used to catch the water in case excessive pressure is applied to the gauge.

Water is supplied to tank 62 and the height to which it will rise in glass tube 63 will depend upon the pressure applied to the surface of the water from pipe 59. Since this pipe is connected to the feed pipe 49 for the acetylene, the pressure on the water in tank 62 will vary with the pressure of acetylene, and the flow of acetylene and therefore the quantity of smoke produced will vary with the pressure. After the burner and piping have been installed, the scale 64 is calibrated in acetylene flow in liters per minute.

Figure 7:
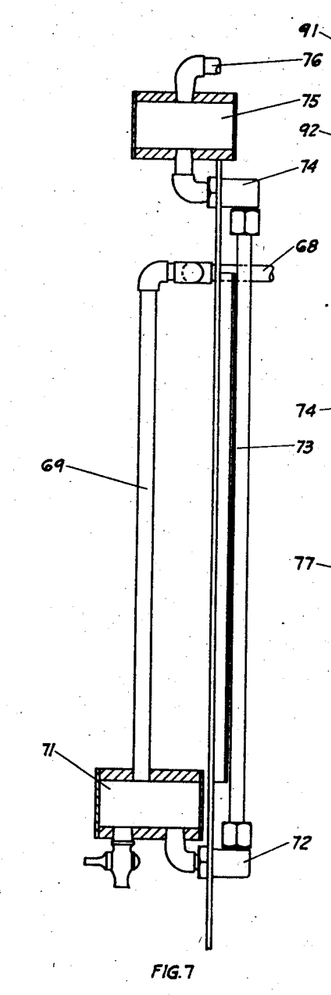
Fig. 7 is an end elevation of the instrument board with parts in section showing the connections of the orifice meter for measuring air flow through the impregnating chamber.
Figure 8:
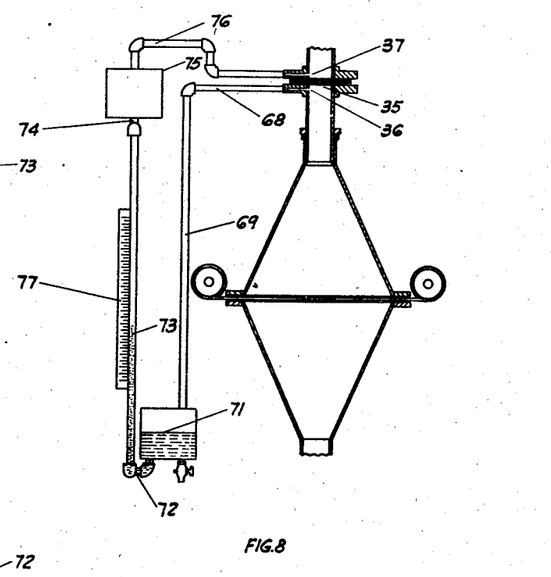
Fig. 8 is a diagrammatic view of the air flow measuring apparatus.

In order to know at all times the quantity of air and smoke passing through the paper while in the impregnating chamber, a measuring apparatus is connected on opposite sides of the orifice plate 35, as shown diagrammatically in Fig. 8. The opening 36, Fig. 3, on the high pressure side of the orifice plate has connected thereto a pipe 68, Figs. 6 and 7, which passes through panel 58 and is connected to vertical pipe 69. The lower end of pipe 69 passes through the upper cover of tank 71, through the lower cover of which passes pipe 72. A gauge glass 73 is supported on the front of panel 58, having its lower end connected to pipe 72 and its upper end connected by pipe 74 to an upper tank 75. The low pressure opening 37 above orifice plate 35 is connected to the upper portion of tank 75 by a pipe 76. A scale 77 is secured in back of glass 73 and is calibrated in air flow through the machine in liters per minute, the scale being calibrated after installation. The water will rise and fall in tube 73 in accordance with the flow of air and smoke past the orifice plate.

It is also necessary for maximum efficiency of the machine that the operator know at all times the resistance of the paper to flow of air therethrough. It has been found that the air flow resistance of the paper varies considerably even in different portions of the same roll. By means of the measuring device about to be described, the operator may know the air flow resistance of the paper as it is being impregnated and may compensate for variations thereof by varying the speed of the paper through the machine, thus varying the amount of impregnation. Referring to Figs. 3, 4, 6, and 10, the lower hood 17 of the impregnating chamber has an opening 78 in which is secured a connector 79 having a pipe 81 connected thereto. Pipe 81 is connected to the upper part of a tank 82 supported on the back of panel 58. Supported on the front of panel 58 is an angular glass gauge 83 having its lower end connected to pipe 84 which in turn is connected to the lower portion of tank 82.

Figure 10:
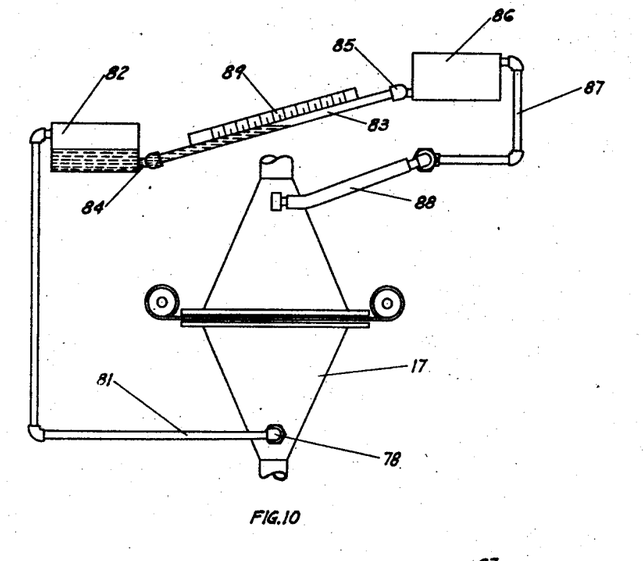
Fig. 10 is a similar view of the apparatus for measuring the resistance to flow of air through the impregnated material.

The upper end of gauge glass 83 is connected to coupling 85 which passes through the panel 58 and connects with the lower portion of a tank 86 supported on the rear of the panel. A pipe 87 is connected to the upper portion of tank 86 and extends to the front of panel 58 and is connected to a rubber hose 88 which is connected into the upper movable hood 16 of the impregnating chamber. The pipe connected to hood 16 is made flexible to allow this hood to be raised and lowered without disconnecting the pipes. A scale 89 is positioned in back of gauge glass 83 and is calibrated in resistance in millimeters of water at 85 liters per minute air flow per 100 centimeters area.

The height of water in the gauge glass 83 will vary with the differential in pressure in the upper and lower hoods of the impregnating chamber, that is, on opposite sides of the paper. With a constant suction on the upper hood as hereinafter described, the differential in pressure on opposite sides of the paper as it passes through the machine gives a direct indication of the resistance of the paper to air flow.

Figure 5:
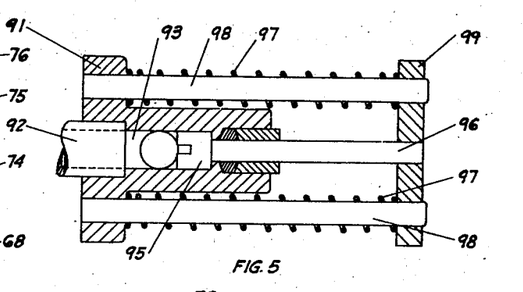
Fig. 5 is an enlarged detail section of one connection to the impregnation chamber.

In using this machine to impregnate filter paper, the suction pulls some of the fibers free from the paper and these loose fibers will partially stop the small opening in the upper hood 16 connected to flexible pipe 88. In order to clear this opening of fibers readily without stopping the machine, the following device is used. As seen in Figs. 3 and 5, hose 88 is connected to a special fitting comprising a base 91 secured to a short nipple 92 which is mounted in an opening in hood 16. A chamber 93 in the base communicates with the nipple 92 and has a smaller opening in alignment with nipple 92, and an opening at right angles thereto having a nipple 94 therein. Hose 88 is secured to the end of nipple 94.

From Fig. 5 it will be seen that the inner wall of chamber 93 is of the same diameter as the interior of nipple 92. A plunger head 95 is within chamber 93 and has a stem 96 projecting out of the chamber, a suitable packing and packing gland being positioned around the stem. Plunger head 95 is normally retained in its outer position by coil springs 97 surrounding guide pins 98 which are secured to base 91 and have their outer ends slidably positioned in openings in handle 99. Handle 99 is secured to the end of stem 96.

By pressure on handle 99, plunger head 95 may be passed through chamber 93 and through nipple 92, dislodging any collected fibers. Upon release, the parts quickly return to the position shown in Fig. 5.

The operation of the invention is as follows. The three-way cocks 18 and 39 are set to by-pass smoke around the impregnating chamber through pipe 42, vacuum pump 44 is started, and a roll of unimpregnated filter paper is supported on frame 1. Upper hood 16 is raised until latch 38 catches and the end of the paper is fed through the machine, passing below roller 4, through the impregnating chamber, beneath and partially around roller 5, and is wound on roller 6. Tests have shown that an acetylene flow of about 8 liters per minute with the air adjustment about half open give a good quality smoke for filter paper impregnation. These settings are then made, the acetylene flow being read from gauge 63. Upper hood 16 is then lowered and the motor 8 is started. Stop cocks 18 and 39 are then turned to direct flow of smoke and air through the impregnating chamber.

The speed controller 15 for motor 8 is then adjusted so as to draw the paper through the machine at a speed in accordance with air resistance of the paper. The air resistance is read from gauge 83, this resistance varying as the paper is fed through the machine. Seven hundred liters per minute of air and smoke are drawn through the moving paper web as it is impregnated with carbon.

The gauge 83 for measuring resistance of the paper to air flow is calibrated in terms of eighty-five liters per minute per one hundred sq. cm. No zero is marked on the scale because the impregnator is not air-tight where the paper web passes in and out. The amount of air leakage at these points depends on the characteristics of the paper web. The resistance gauge is set by impregnating a sample of each lot of paper, measuring the resistance of each sample on an accurate resistance meter (not shown or described herein), and the gauge 83 is set to correspond to the resistance of the impregnated sample.

The operator of the machine may easily note any change in resistance of the paper during impregnation and may readily adjust the speed of the motor 8 by handle 15. Also any variation of acetylene flow is at once indicated on gauge 63, and the total smoke and air mixture passing through the machine is indicated on gauge 73.

It will be noted that the machine proper and the smoke generator are not directly connected. However, the suction through the hood 19 is sufficient to draw all smoke and carbon into the machine, air of course being also drawn in at this point. This incoming air mixes with and scatters the carbon particles to further prevent any tendency of them to adhere. Also the pyramidal hoods 16 and 17 cause the carbon particles to spread evenly over the entire cross section, thus giving even impregnation over the entire cross section of the filter material. The wire mesh 27 just above the paper prevents the suction from pulling the paper out of position.

Periodically the operator pushes plunger 95 in to dislodge any loose fibers which may collect and obstruct the opening in the upper hood 16 which is connected to the air resistance gauge 83.

Due to the drive connection for the filter paper, the speed of the paper through the machine remains constant unless changed by the operator. Even though the receiving roll increases in size, the friction drive thereof by drive roll 5 results in a constant speed, a feature very necessary to secure even impregnation of the paper.

The quality of impregnation is in part dependent upon the quantity of air and acetylene and the temperature of the smoke. These factors may be easily regulated by varying the acetylene and air mixture and by varying the amount of water circulating around the inside of the burner.

When a fresh roll of material for impregnation is to be inserted, the valves 18 and 39 are operated to divert the smoke through the by-pass conduit 42, after which the hood 16 may be raised and the new roll inserted in place. By this procedure, generation of smoke need not be changed or interrupted. If the smoke as generated is not drawn off, the carbon particles will collect in the pipes and valves, and uneven impregnation results when these agglomerated carbon particles break loose.

All gauges are positioned for ready observation, and all controls are accessible, so that one operator can handle the complete machine. Due to the friction drive between receiving roller 6 and driven roller 5 around which or in contact with which the paper passes before being wound on the receiving roll, a constant speed of paper through the machine is provided. The very fine carbon particles are drawn into the paper and adhere to the fibers. The smoke particles do not collect on the surface nor do they lodge between the fibers and thus largely increase the resistance of the impregnated paper to air flow.

While we have shown and described the preferred embodiment of our invention, we wish it to be understood that we do not confine ourselves to the precise details of construction herein set forth by way of illustration, as it is apparent that many changes and variations may be made therein by those skilled in the art, without departing from the spirit of the invention nor exceeding the scope of the appended claims.

We claim:

1. A machine for impregnating filter material with fine carbon particles comprising a generator for fine carbon particles, an impregnating chamber, means for causing the carbon particles to pass through said chamber, and means for drawing filter material through said chamber transverse to the flow of carbon particles.

2. A machine for impregnating filter material with fine carbon particles comprising an impregnating chamber, means for causing fine carbon particles to pass through said chamber, and variable speed means for drawing a continuous sheet of filter material through said chamber transverse to the flow of carbon particles.

3. A machine for impregnating filter material with fine carbon particles comprising an impregnating chamber, means for causing fine carbon particles to pass through said chamber, means to draw a continuous sheet of filter material through said chamber transverse to the flow of carbon particles, and a gauge connected to the impregnating chamber indicating the resistance to flow of air through the filter material as it passes through said chamber.

4. A machine for impregnating filter material with fine carbon particles comprising an impregnating chamber, means for drawing a continuous sheet of filter material transversely through said chamber, means for drawing gas carrying fine carbon particles through said chamber and the filter material, a gauge connected to the impregnating chamber for indicating the resistance to flow of air through the filter material as it passes through said chamber, and means to vary the speed of movement of the filter material through said chamber.

5. A machine for impregnating filter material with fine carbon particles comprising an impregnating chamber, means for drawing a continuous sheet of filter material through said chamber, means for propelling a current of gas laden with fine carbon particles through said chamber and said filter material, a differential pressure responsive gauge connected to the impregnating chamber on opposite sides of said filter material to measure the resistance of the material to flow of air therethrough, and manually adjustable means to vary the speed of the filter material through the machine in accordance with readings of said gauge.

6. A machine for impregnating a continuous sheet of filter material comprising a generator of smoke having fine carbon particles suspended therein, an impregnating chamber having an opening adjacent but not connected to the outlet of said smoke generator, suction means for drawing the smoke from said generator through said impregnating chamber, and means for drawing a sheet of filter material through said chamber transverse to flow of smoke therethrough.

7. In a machine for impregnating a continuous sheet of filter material with fine carbon particles, a generator for smoke containing fine carbon, an impregnating chamber, means for drawing a sheet of filter material through said chamber, suction means for withdrawing the smoke from said generator, and selective means for passing said smoke through the impregnating chamber or by-passing it around said chamber.

8. In a machine for impregnating a continuous sheet of filter material with fine carbon particles, a generator for smoke containing fine carbon particles, an impregnating chamber, means for passing a sheet of filter material through said chamber, suction means for drawing the smoke from said generator, a by-pass conduit around said chamber, and valves arranged to cause the suction means to draw the smoke through the impregnating chamber or the by-pass conduit.

9. A machine for impregnating filter material with fine carbon particles comprising an impregnating chamber, means for passing a continuous sheet of filter material through said chamber, means for passing a stream of gas through said chamber and through the filter material, and indicating means connected to the impregnating chamber for showing the total gas and air passing through the chamber.

10. A machine for impregnating a continuous sheet of filter material comprising an impregnating chamber, means for moving a sheet of filter material transversely through said chamber, an acetylene burner, an acetylene tank connected to said burner for generating smoke containing fine carbon particles, suction means for drawing the smoke through said chamber and through the moving sheet of filter material, and an indicator, showing the quantity of acetylene flow to said burner, and a valve for varying the acetylene flow whereby the quantity and quality of smoke may be varied, respectively, interposed in the connection between the acetylene tank and acetylene burner.

11. A machine for impregnating a sheet of filter material comprising an impregnating chamber, means for passing a sheet of filter material through said chamber, a generator for smoke containing fine carbon particles, suction means for drawing the smoke through said chamber and through the filter material, an indicator connected with the impregnating chamber for showing the resistance to flow of air through the filter material during impregnation, and an indicator connected between the impregnating chamber and the suction means for showing the total quantity of air and smoke passing through the filter material.

12. In a machine for impregnating a sheet of filter paper, an impregnating chamber, means for drawing a continuous sheet of filter paper across said chamber, means for passing gas carrying impregnating particles through said chamber and the paper, said chamber having an opening in one wall above the paper and a pipe mounted in said opening and connected to a pressure responsive gauge, and means to clear the opening in said chamber of fibers liberated from the paper comprising a plunger manually reciprocable through said opening.

13. The method of impregnating a continuous sheet of filter material with fine carbon particles comprising moving the filter material through a stream of gas laden with fine carbon particles, measuring the resistance of the filter material to air flow therethrough, and varying the speed of the filter material in accordance with variations in air resistance thereof.

14. The method of impregnating fine carbon particles into a continuous sheet of filter material having a variable resistance to flow of air therethrough so as to have a substantially constant resistance to air flow through the impregnated sheet, comprising moving the sheet of filter material through a stream of gas laden with fine carbon particles continuously measuring the resistance of the filter material to air flow during its passage through the stream of gas, and varying the speed of the filter material through the stream of gas in accordance with variations in the air resistance.

15. In a machine for impregnating a continuous sheet of filter material, an impregnating chamber provided with means for passing a sheet of filter material therethrough to be impregnated while in transit, a roller upon which the filter material winds after impregnation, and controllable means for driving said roller at a linear speed which is independent of the size of the material on the roller.

16. In a machine for impregnating a continuous sheet of filter material, an impregnating chamber provided with means for passing a sheet of filter material therethrough to be impregnated while in transit, and means to pull said material through said chamber at a predetermined linear speed, comprising a receiving roller on which the material winds, and a driven roller around which the material passes and then winds on the receiving roller, said receiving roller being driven by frictional contact with the moving material.

17. In a machine for impregnating a continuous sheet of filter material, an impregnating chamber provided with means for passing a sheet of filter material therethrough to be impregnated while in transit, and means to pull said material through said chamber, comprising a driving roller around a part of the circumference of which the material passes, a receiving roller upon which the material winds, the receiving roller being in frictional engagement with and driven by the material and manually operable means for controlling the driving speed of the driving roller.

STUART M. JESSOP.
HARRY E. DYER.

REFERENCES CITED

The following references are of record in the file of this patent:

UNITED STATES PATENTS

| Number | Name | Date |
| --- | --- | --- |
| 358,647 | Campbell | Mar. 1, 1887 |
| 1,955,552 | Kruger | Apr. 17, 1934 |
| 1,798,164 | Kuhn | Mar. 31, 1931 |
| 2,053,781 | Reichel | Sept. 8, 1936 |
| 420,354 | Odenheimer | Jan. 28, 1890 |
| 1,612,310 | Oppenheimer | Dec. 28, 1926 |
| 2,123,604 | Johnson | July 12, 1938 |
| 2,288,072 | Collins | June 30, 1942 |
| 1,818,155 | Oglesby | Oct. 28, 1926 |